United States Patent
Tsai (10) Patent No.: US 8,833,546 B2
(45) Date of Patent: Sep. 16, 2014

(54) WEB PRODUCT SORTING MACHINE

(75) Inventor: Tung-I Tsai, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 614 days.

(21) Appl. No.: 12/945,093

(22) Filed: Nov. 12, 2010

(65) Prior Publication Data

US 2011/0056797 A1 Mar. 10, 2011

Related U.S. Application Data

(63) Continuation-in-part of application No. 12/556,176, filed on Sep. 9, 2009.

(30) Foreign Application Priority Data

Jan. 29, 2010 (TW) .............................. 99201893 U (51) Int. Cl.
| | |
|---|---|
| B65G 21/14 | (2006.01) |
| B07B 13/04 | (2006.01) |
| B07B 13/05 | (2006.01) |
| B65H 31/30 | (2006.01) |
| B65G 47/51 | (2006.01) |
| B65G 47/71 | (2006.01) |

(52) U.S. Cl.
CPC ............ *B07B 13/04* (2013.01); *B65G 47/5131* (2013.01); *B65G 21/14* (2013.01); *B65G 47/71* (2013.01); *B07B 13/05* (2013.01); *B65H 31/3009* (2013.01); *B65H 2301/41484* (2013.01); *B65H 2301/42261* (2013.01); *B65H 2301/42264* (2013.01); *B65H 2404/254* (2013.01); *B65H 2404/2691* (2013.01)
USPC ......................... 198/812; 198/594; 198/369.7

(58) Field of Classification Search
USPC .......... 198/374, 411, 416, 812, 594; 209/615, 209/659
See application file for complete search history.

(56) References Cited

U.S. PATENT DOCUMENTS

| | | | | |
|---|---|---|---|---|
| 1,576,338 | A * | 3/1926 | Ladd | ............................. 414/415 |
| 5,442,985 | A | 8/1995 | Ito | |
| 5,475,917 | A * | 12/1995 | Biagiotti | ......................... 29/822 |
| 6,082,733 | A | 7/2000 | Borel | |
| 6,371,304 | B2 * | 4/2002 | Gambini | ....................... 209/620 |
| 6,427,825 | B1 * | 8/2002 | Biagiotti | .................... 198/461.2 |
| 6,820,750 | B2 * | 11/2004 | Gambini | ....................... 209/681 |
| 7,490,712 | B2 | 2/2009 | Hamers et al. | |
| 8,167,136 | B2 * | 5/2012 | Betti | ............................. 209/620 |
| 2007/0272514 | A1 | 11/2007 | Hamers et al. | |

FOREIGN PATENT DOCUMENTS

| | | | |
|---|---|---|---|
| DE | 3446735 A1 | 6/1986 | |
| DE | 29704889 U1 | 8/1998 | |
| EP | 0124177 A1 | 11/1984 | |
| TW | 387413 | 4/2000 | |
| WO | WO 2009075005 A1 * | 6/2009 | ............... B62D 7/18 |

* cited by examiner

*Primary Examiner* — William R Harp
(74) *Attorney, Agent, or Firm* — Rosenberg, Klein & Lee (57) ABSTRACT

A web product sorting machine includes a first conveyor unit, a second conveyor unit set adjacent to the first conveyor unit, and a screening unit. A gap is defined between the first conveyor unit and the second conveyor unit. The first conveyor unit is adapted for delivering web products and tail wastes and for enabling web products to be sent to the second conveyor unit. The screening unit is set above the first conveyor unit for screening the web products and the tail wastes to cause each passed tail waste to fall onto the first conveyor unit from a standing position and then to fall out of the first conveyor unit through the gap.

12 Claims, 12 Drawing Sheets

WEB PRODUCT SORTING MACHINE

CROSS-REFERENCES TO RELATED APPLICATIONS

This application is a continuation in part of application Ser. No. 12/556,176, filed Sep. 9, 2009, which claims priority to Taiwan, R.O.C. patent application No. 099201839, filed Jan. 29, 2010, which is hereby incorporated by reference herein.

BACKGROUND OF THE INVENTION

1. Field of the Invention

The present invention relates to a web product sorting machine, which includes a screening unit disposed above a first conveyor unit to screen delivering web products, causing each passed tail waste to fall onto the first conveyor unit from a standing position.

2. Background of the Invention

Figure 1:
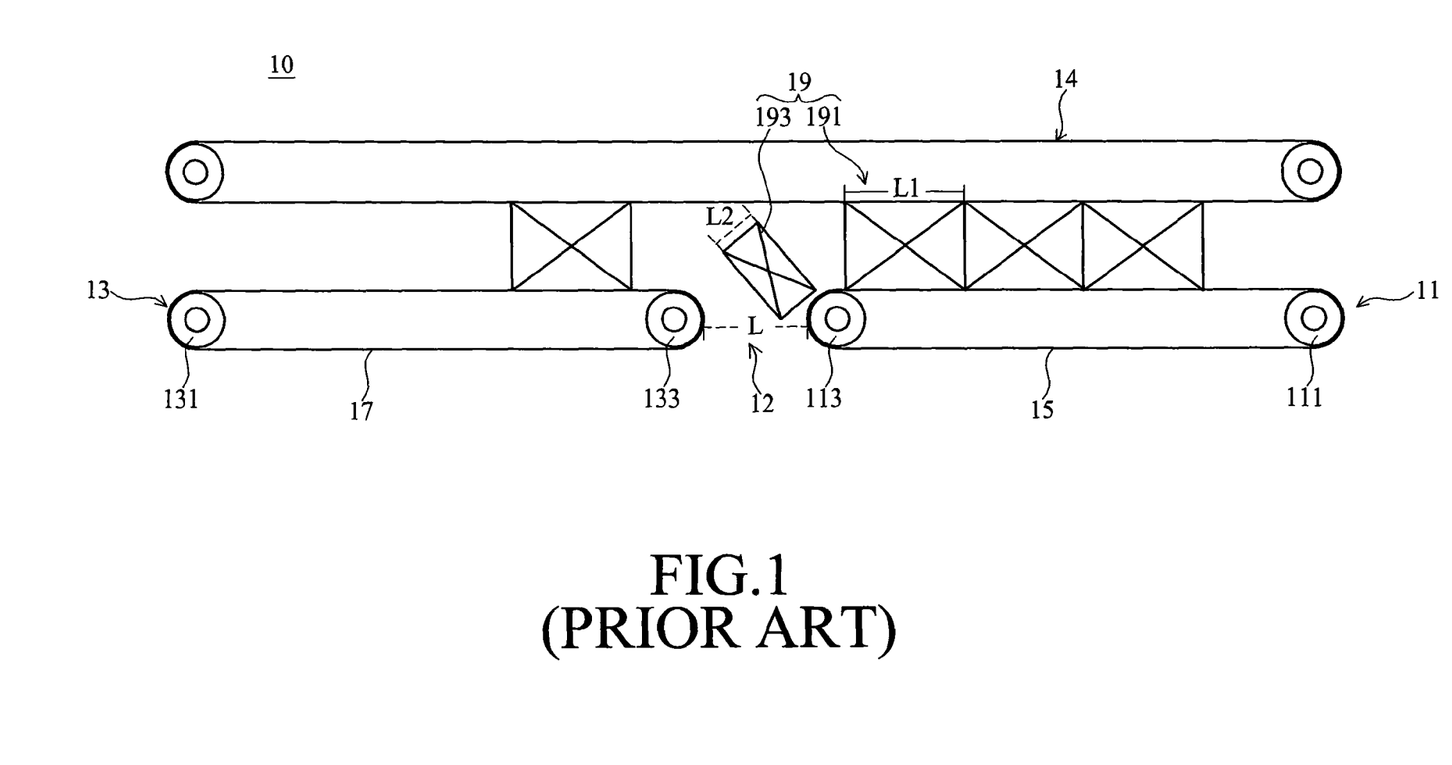
FIG. 1 is a schematic drawing showing the architecture of a web product sorting machine according to the prior art.

FIG. 1 illustrates a web product sorting machine according to the prior art. According to this design, the web product sorting machine 10 comprises a first conveyor unit 11, a second conveyor unit 13 arranged at the same elevation relative to the first conveyor unit 11 and kept apart from the first conveyor unit 11 by a gap 12, and a top conveyor unit 14 arranged above the first conveyor unit 11 and the second conveyor unit 13. The first conveyor unit 11 comprises a first drive wheel 111, a first driven wheel 113 and a first conveyor belt 15 wound around the first drive wheel 111 and the first driven wheel 113. The second conveyor unit 12 comprises a second drive wheel 131, a second driven wheel 133 and a second conveyor belt 17 wound around the second drive wheel 131 and the second driven wheel 133.

During application, the top conveyor unit 14, the first conveyor unit 11 and the second conveyor unit 13 are rotated to deliver test products 19. The first drive wheel 111 and the second drive wheel 131 are drive sources controlled to move the first conveyor belt 15 and the second conveyor belt 17, thereby delivering the test products 19. In actual practice, the transverse width L of the gap 12 is approximately equal to the width L1 of the test products 191. Thus the test products 191 that are carried forwards by the first conveyor belt 15 will be delivered to the second conveyor belt 17 subject to an inertia effect.

Any test product 19 having a width L2 smaller than the width L of the gap 12 is regarded as a defective product 193. When one defective product 193 is delivered by the first conveyor belt 15 toward the second conveyer belt 17, the defective product 193 will fall into the gap 12, achieving screening.

The aforesaid prior art web product sorting machine 10 is still not satisfactory in function. For example, the top conveyor unit 14 and the first conveyor unit 11 will secure and deliver quality test products 191 and defective test products 193 during operation, and the secured defective products 193 tend to be delivered from the first conveyor unit 11 over the gap 12 to the second conveyor unit 13 due to inertia effect, resulting in screening inaccuracy.

Therefore, it is desirable to provide a web product sorting machine that eliminates the aforesaid problem.

SUMMARY OF THE PRESENT INVENTION

It is, therefore, the primary object of the present invention to provide a web product sorting machine, which uses a first conveyor unit to deliver web products and tail wastes toward a second conveyor unit and uses a screening unit to screen web products and tail wastes delivered by the first conveyor unit, causing every passed tail waste to fall onto the first conveyor unit from a standing position for further sorting from the web products.

It is another object of the present invention to provide a web product sorting machine, which uses a feed unit to feed web products and head wastes to the first conveyor unit. The feed unit is disposed at a relatively higher position then the first conveyor unit, so that every fed head waste will fall onto the first conveyor unit from a standing position, facilitating further sorting.

It is still another object of the present invention to provide a web product sorting machine, which uses a connection unit to connect between the feed unit and the first conveyor unit and keeps the connection unit sloping downwardly toward the first conveyor unit so that every head waste will fall onto the first conveyor unit from a standing position, facilitating further sorting.

It is still another object of the present invention to provide a web product sorting machine, which has an elastically deformable damper set above the first conveyor unit at a distance shorter than the height of the web products so that every passed tail waste will be forced to fall onto the conveyor unit from a standing position, facilitating further sorting.

It is still another object of the present invention to provide a web product sorting machine, which has a gap between the first conveyor unit and the second conveyor unit and enables every delivering head waste and tail waste to fall onto the first conveyor unit from a standing position, so that every head waste and tail waste will fall out of the first conveyor unit through the gap.

It is still another object of the present invention to provide a web product sorting machine, which allows adjustment of the position of movable wheel set of the first conveyor unit and/or the second conveyor unit to change the size of the gap between the first conveyor unit and the second conveyor unit, facilitating sorting of web products, head wastes and tail wastes.

To achieve these and other objects, the present invention provides a web product sorting machine, comprising: a first conveyor unit adapted for delivering at least one web product and at least one tail waste and/or at least one head waste; a second conveyor unit disposed adjacent to said first conveyor unit and adapted for receiving said web product and said tail waste and/or said head waste from said first conveyor unit, wherein a gap is defined between said first conveyor unit and said second conveyor unit for enabling said at least one tail waste to fall therein; and a screening unit disposed above said first conveyor unit adapted for touching said web product and said tail waste being delivered by said first conveyor unit to cause said tail waste to fall onto said first conveyor unit from a standing position.

The invention further provides a web product sorting machine, comprising: a first conveyor unit adapted for delivering at least one web product and at least one head waste and/or at least one tail waste; a second conveyor unit disposed adjacent to said first conveyor unit and adapted for receiving said web product from said first conveyor unit, wherein a gap is defined between said first conveyor unit and said second conveyor unit for enabling said head waste to fall therein; and a feed unit connected to said first conveyor unit, wherein said feed unit is disposed at an elevation higher than said first conveyor unit for feeding said web product and said head waste and/or said tail waste to said first conveyor unit and for enabling said head waste to fall onto said first conveyor unit from a standing position.

DETAILED DESCRIPTION OF THE PREFERRED EMBODIMENTS

Figure 2:
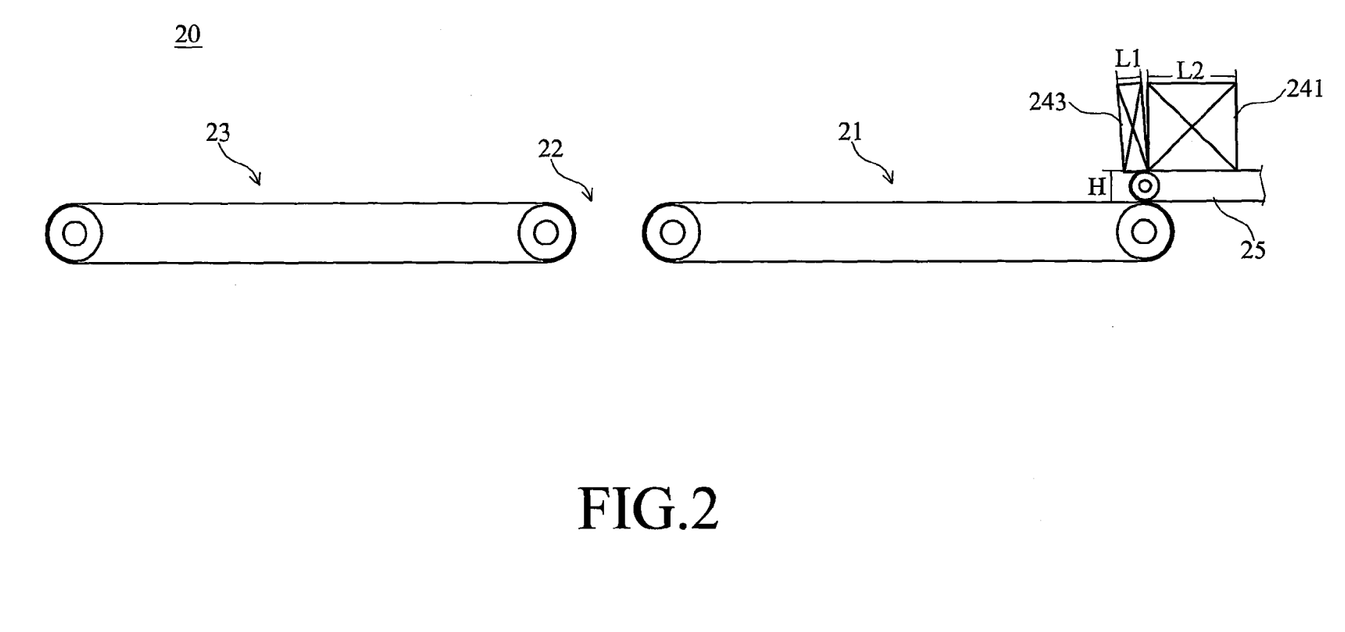
FIG. 2 is a schematic drawing showing the basic architecture of a web product sorting machine in accordance with the present invention.

Please refer to FIG. 2, a web product sorting machine 20 in accordance with the present invention is shown. The web product sorting machine 20 comprises a first conveyor unit 21, a second conveyor unit 23 and a feed unit 25. By means of the first conveyor unit 21, the second conveyor unit 23 and the feed unit 25, web products 241 and head wastes 243 are delivered and sorted.

Figure 3:
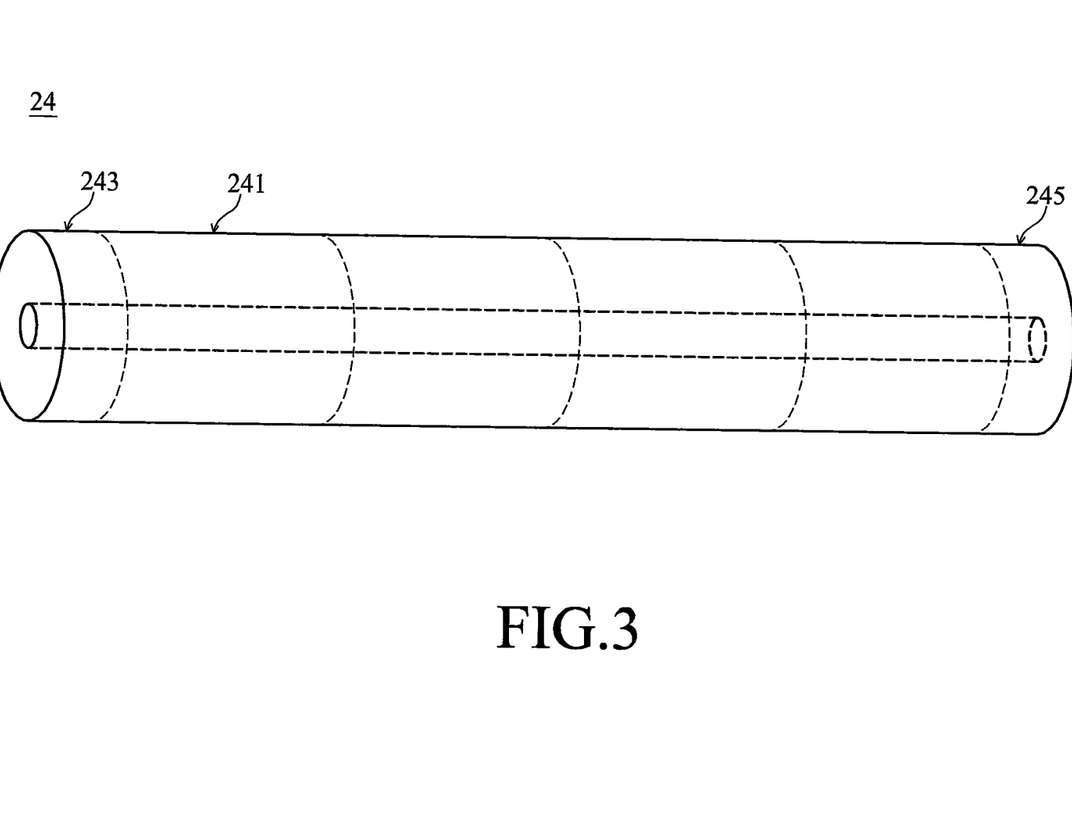
FIG. 3 is a perspective view showing the structure of a cylindrical web product.

In one application example of the present invention, the web products 241 can be toilet paper rolls, toilet paper, or facial tissue. During fabrication of web products 241, cylindrical fiber materials 24 are cut into web products 241 subject to a predetermined size and length. When cutting one cylindrical fiber material 24 into multiple web products 241, a head waste 243 and a tail waste 245 may be produced. The length of the head waste 243 and the length of the tail waste 245 are shorter than the length of the web products 241, not suitable for sale, as shown in FIG. 3.

The web product sorting machine 20 sorts web products 241, head wastes 243 and tail wastes 245 subject to their length. In actual practice, the machine can sort qualified web products 241 and short defective products.

The first conveyor unit 21 is connected to the feed unit 25. The feed unit 25 feeds at least one web product 241, at least one head waste 243 and/or at least one tail waste 245 to the first conveyor unit 21 for delivery by the first conveyor unit 21. The feed unit 25 is disposed at a relatively higher position than the first conveyor unit 21 so that an elevation difference H is kept between the feed unit 25 and the first conveyor unit 21.

As stated above, the length L1 of each head waste 243 is relatively smaller, for example, the length L1 of each head waste 243 is smaller than the height of the head waste 243. Therefore, during feeding of one head waste 243 from the feed unit 25 to the first conveyor unit 21, the head waste 243 will fall to the first conveyor unit 21 subject to the elevation difference H.

The first conveyor unit 21 and the second conveyor unit 23 are arranged adjacent to each other, allowing delivery of at least one web product 241 from the first conveyor unit 21 to the second conveyor unit 23. Further, a gap 22 is left between the first conveyor unit 21 and the second conveyor unit 23. During delivery of web products 241, head wastes 243 and/or tail wastes 245 from the first conveyor unit 21 to the second conveyor unit 23, every short head waste 243 and/or tail waste 245 will fall through the gap 22, and therefore, web products 241, head wastes 243 and/or tail wastes 245 are sorted.

Because every head waste 243 fed by the feed unit 25 to the first conveyor unit 21 is kept on the first conveyor unit 21 in a fallen status, it will fall through the gap 22 between the first conveyor unit 21 and the second conveyor unit 23 during delivery, and therefore head wastes 243 and web products 241 are sorted. Further, keeping every head waste 243 on the first conveyor unit 21 in a fallen status during delivery prevents erroneous delivery of head wastes 243 from the first conveyor unit 21 over the gap 22 to the second conveyor unit 23 subject to an inertia effect as commonly seen in the prior art design.

Figure 4:
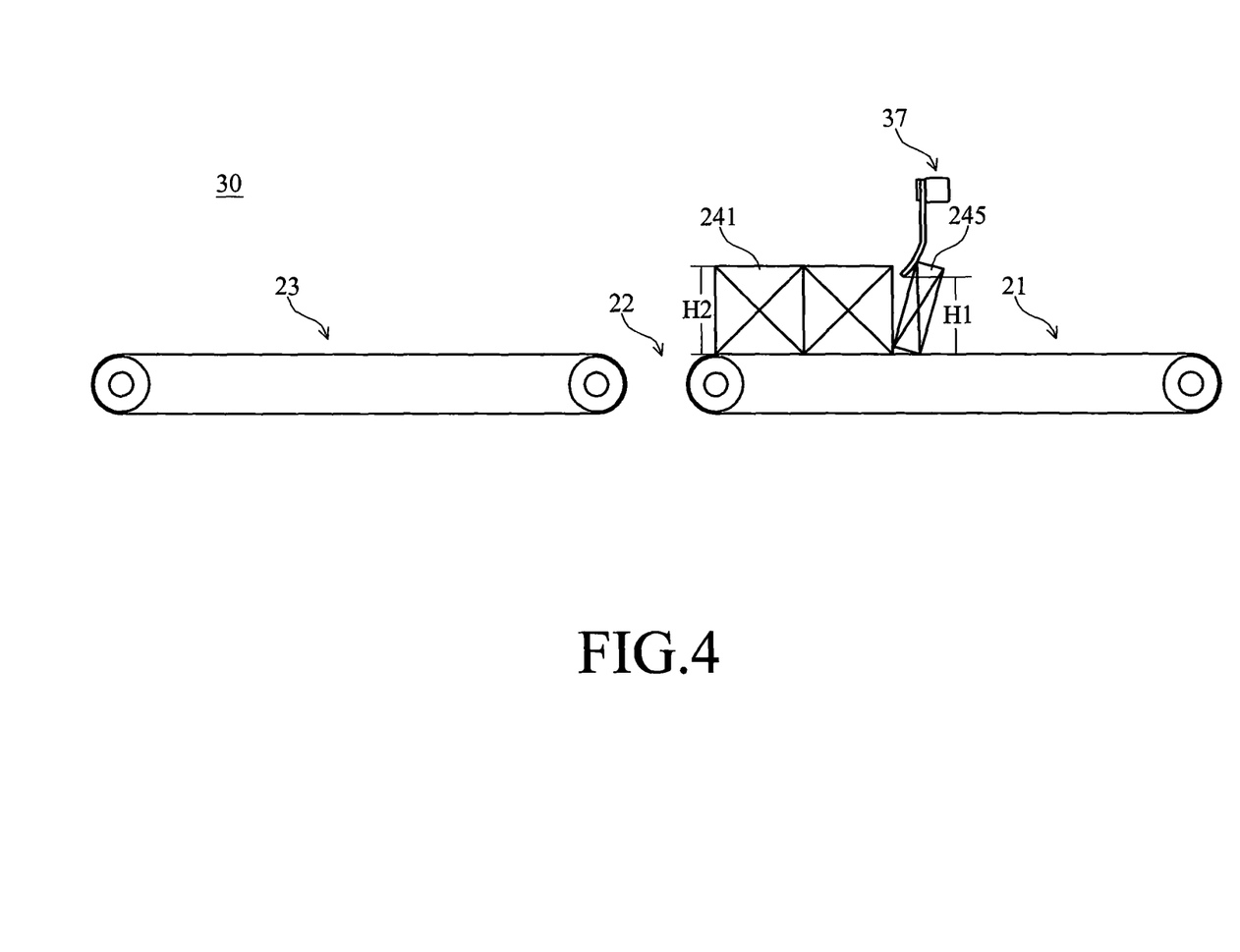
FIG. 4 is a schematic drawing showing an alternate form of the web product sorting machine in accordance with the present invention.

FIG. 4 illustrates an alternate form of the web product sorting machine in accordance with the present invention. According to this alternate form, the web product sorting machine 30 comprises a first conveyor unit 21, a second conveyor unit 23 and a screening unit 37. A gap 22 is left between the first conveyor unit 21 and the second conveyor unit 23. Thus, the web product sorting machine 30 is practical for delivering and sorting web products 241 and short tail wastes 245 and/or head wastes 243.

The first conveyor unit 21 is controllable to deliver at least one web product 241 and at least one tail waste 245 and/or at least one head waste 243. The second conveyor unit 23 is arranged adjacent to the first conveyor unit 21 and adapted to receive web products 241 from the first conveyor unit 21. The design of the gap 22 between the first conveyor unit 21 and the second conveyor unit 23 enables every tail waste 245 and/or head waste 243 to fall through the gap 22 during delivery. Therefore, web products 241 and short tail wastes 245 and/or head wastes 243 are sorted.

The screening unit 37 disposed above the first conveyor unit 21 touches and screens every web product 241 and tail waste 245 being delivered by the first conveyor unit 21, causing every tail waste 245 to fall onto the first conveyor unit 21 from a standing position. The screening unit 37 can be a damper prepared from an elastically deformable material. The damper (screening unit 37) is spaced above the first conveyor unit 21 at a distance H1 shorter than the height H2 of the web products 241 and/or tail wastes 245. Thus, when one web product 241 or tail waste 245 passes over the damper (screening unit 37), the web product 241 or tail waste 245 will touch the damper (screening unit 37). When the damper (screening unit 37) contacts with the tail waste 245, the first conveyor unit 21 continuously carries the tail waste 245 forwards, causing a friction between the tail waste 245 and the damper (screening unit 37). Because the length L2 of every tail waste 245 is relatively shorter, for example, the length L2 of every tail waste 245 is shorter than its height, the friction between the tail waste 245 and the damper (screening unit 37) will cause the tail waste 245 to fall onto the first conveyor unit 21 from a standing position.

Subject to the aforesaid arrangement, every tail waste 245 being delivered by the first conveyor unit 21 will fall onto the first conveyor unit 21 from a standing position when passing over the screening unit 37. Thereafter, every tail waste 245 will fall through the gap 22 between the first conveyor unit 21 and the second conveyor unit 23 accurately. Thus, the web product sorting machine can effectively sort tail wastes 245 and web products 241, avoiding erroneous delivery of tail wastes 245 from the first conveyor unit 21 over the gap 22 to the second conveyor unit 23 subject to an inertia effect as commonly seen in the prior art design.

Figure 5:
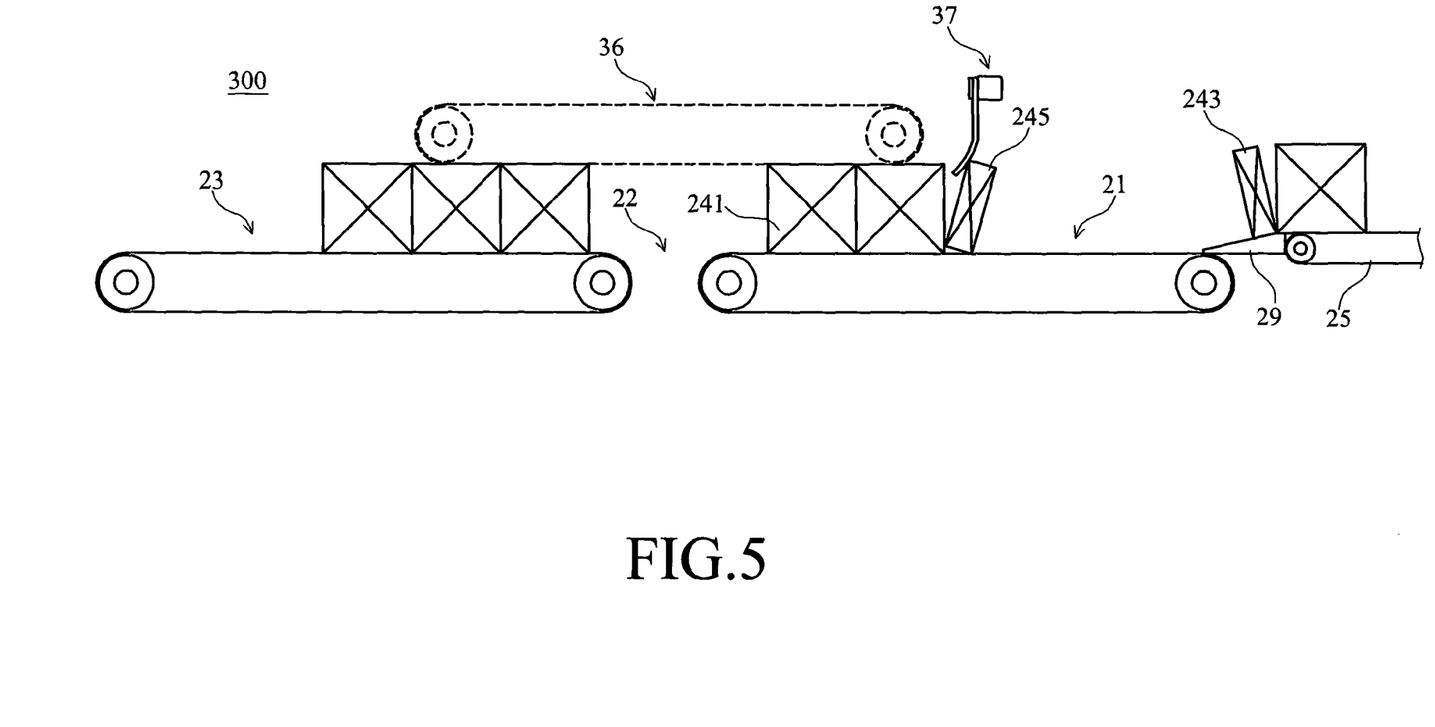
FIG. 5 is a schematic drawing showing another alternate form of the web product sorting machine in accordance with the present invention.

FIG. 5 illustrates another alternate form of the web product sorting machine in accordance with the present invention. According to this alternate form, the web product sorting machine 300 comprises a first conveyor unit 21, a second conveyor unit 23, a feed unit 25, a connection unit 29 and a screening unit 37, facilitating delivery and sorting of web products 241 and short tail wastes 245 and/or head wastes 243.

According to this embodiment, the feed unit 25 is disposed at a higher elevation than the first conveyor unit 21. The connection unit 29 is arranged between the feed unit 25 and the first conveyor unit 21. The connection unit 29 slopes downwardly from the feed unit 25 toward the first conveyor unit 21. Thus, when one head waste 243 is fed by the feed unit 25 to the first conveyor unit 21, it will fall to the first conveyor unit 21 or the connection unit 29. When one tail waste 245 passes over the screen unit 37, it will fall onto the first conveyor unit 21 from a standing position, facilitating sorting and lowering the chance of sorting error.

Further, a top conveyor unit 36 may be disposed above the gap 22, the first conveyor unit 21 and the second conveyor unit 23. During delivery, the top conveyor unit 36, the first conveyor unit 21 and/or the second conveyor unit 23 will touch web products 241, facilitating delivery of web products 241 from the first conveyor unit 21 to the second conveyor unit 23. Further, because every head waste 243 and tail waste 245 is kept in a fallen position on the first conveyor unit 21 during delivery, it will not touch the top conveyor unit 36, allowing every head waste 243 and tail waste 245 to fall through the gap 22 between the first conveyor unit 21 and the second conveyor unit 23.

Figure 6:
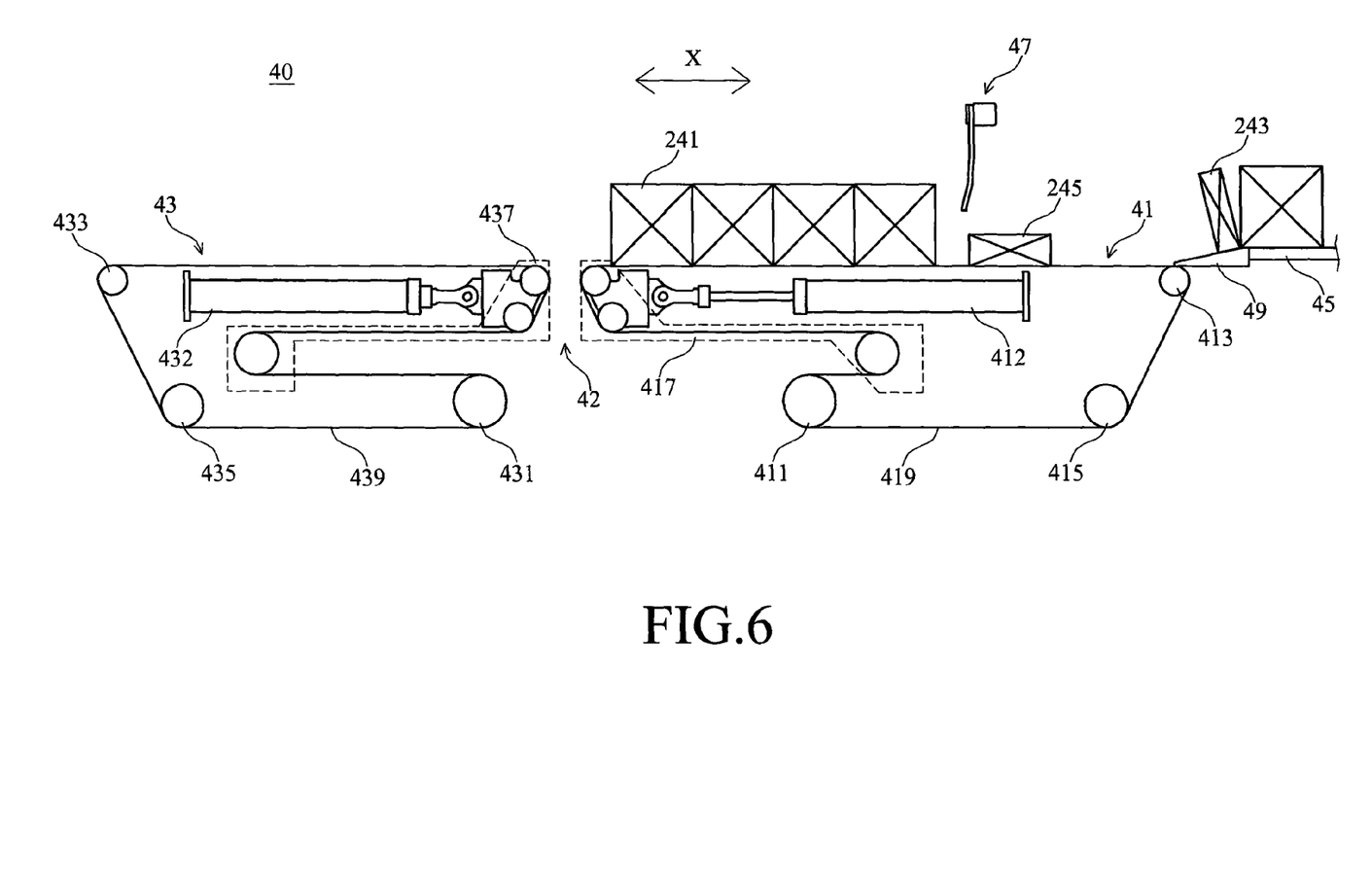
FIG. 6 is a schematic drawing showing still another alternate form of the web product sorting machine in accordance with the present invention.

FIG. 6 illustrates still another alternate form of the web product sorting machine in accordance with the present invention. According to this alternate form, the web product sorting machine 40 comprises a first conveyor unit 41, a second conveyor unit 43, a feed unit 45 and a screening unit 47. Further, a gap 42 is left between the first conveyor unit 41 and the second conveyor unit 43. Thus, the web product sorting machine 40 is practical for delivering and sorting web products 241 and short tail wastes 245 and/or head wastes 243.

According to this embodiment, the feed unit 45 is disposed at a higher elevation than the first conveyor unit 41. Further, a connection unit 49 may be connected between the feed unit 45 and the first conveyor unit 41. The connection unit 49 slopes downwardly from the feed unit 45 toward the first conveyor unit 41. Thus, when one head waste 243 passes through the connection unit 49, it will fall onto the first conveyor unit 21 or connection unit 29 from a standing position.

The screening unit 47 is arranged above the first conveyor unit 41 for causing every tail waste 245 to fall onto the first conveyor unit 41 from a standing position. Moreover, subject to the elevation difference between the feed unit 45 and the first conveyor unit 41 and the arrangement of the screen unit 47, every head waste 243 and tail waste 245 will fall onto the first conveyor unit 41 from a standing position, facilitating falling of every head waste 243 and tail waste 245 through the gap 42.

Further, the first conveyor unit 41 and the second conveyor unit 43 are partially adjustable to that the size of the gap 42 can be changed. According to this embodiment, the first conveyor unit 41 comprises a first drive wheel 411, a first tension wheel 415, a first fixed wheel 413, a first movable wheel set 417 and a first conveyor belt 419. The first conveyor belt 419 is wound round the first drive wheel 411, the first tension wheel 415, the first fixed wheel 413 and the first movable wheel set 417. The first drive wheel 411 is the power source of the first conveyor unit 41. When the first drive wheel 411 is started, it will rotate the first conveyor belt 419 to deliver web products 241, head wastes 243 and tail wastes 245.

The second conveyor unit 43 comprises a second drive wheel 431, a second movable wheel set 437, a second tension wheel 435, a second fixed wheel 433 and a second conveyor belt 439. The second conveyor belt 439 is wound round the second drive wheel 431, the second tension wheel 435, the second fixed wheel 433 and the second movable wheel set 437. The second drive wheel 431 is the power source of the second conveyor unit 439. When the second drive wheel 431 is started, it will rotate the second conveyor belt 439 to deliver web products 241, head wastes 243 and/or tail wastes 245.

The first movable wheel set 417 and the second movable wheel set 437 are movable components. According to this embodiment, the first conveyor unit 41 and the second conveyor unit 43 are disposed at one same elevation, and the first movable wheel set 417 and the second movable wheel set 437 are respectively connected to a first air cylinder 412 and a second air cylinder 432. Thus, the first movable wheel set 417 and the second movable wheel set 437 are movable in a first direction X to adjust the gap 42 between the first conveyor unit 41 and the second conveyor unit 43.

Figure 7A:
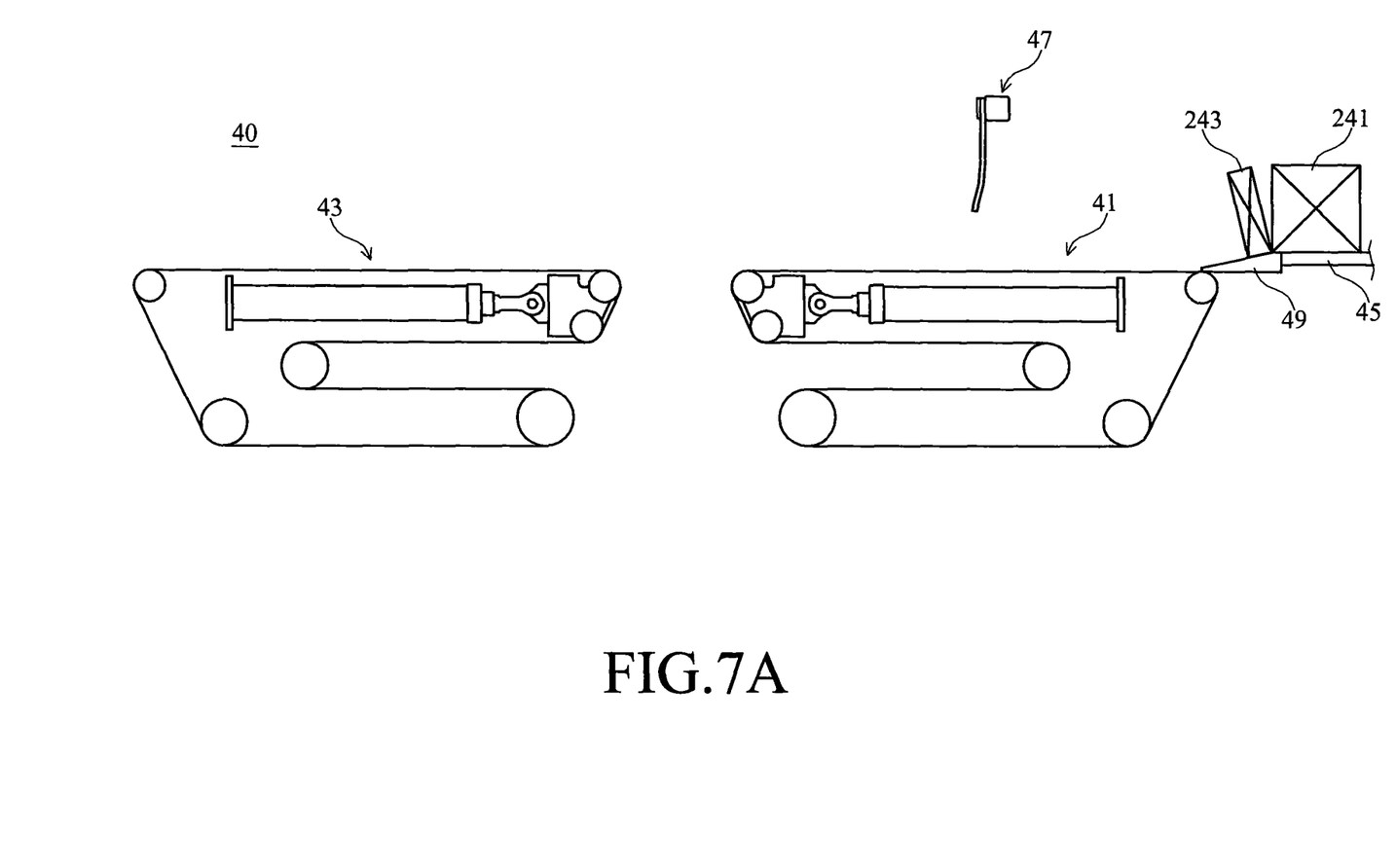
FIGS. 7A~7F illustrate the operation flow of the web product sorting machine in accordance with present invention.

FIGS. 7A through 7F show an operation flow of the present invention. As illustrated, the web product sorting machine 40 comprises a first conveyor unit 41, a second conveyor unit 43, a feed unit 45, a screening unit 47 and a connection unit 49. To facilitate explanation, the invention starts from the feed unit 45 that feeds head wastes 243, web products 241 and tail wastes 245 to the first conveyor unit 41 through the connection unit 49. Because the elevation of the feed unit 45 is higher than the first conveyor unit 41 and the connection unit 49 slopes downwardly from the feed unit 49 toward the first conveyor unit 41, the head waste 243 will lose its balance during feeding by the feed unit 45 toward the first conveyor unit 41, due to the effects of gravity, as shown in FIG. 7A.

Figure 7B:
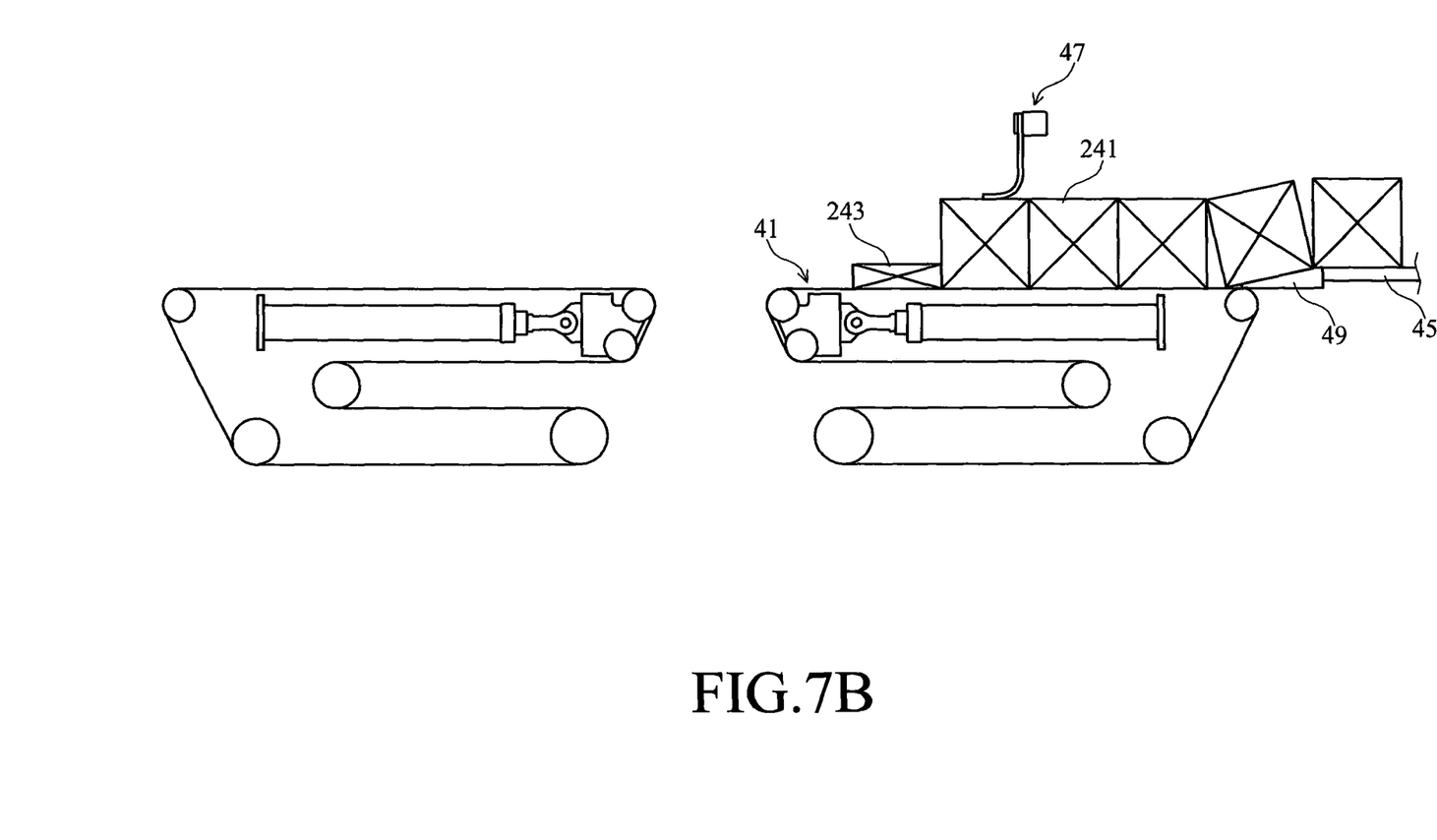

Because the head waste 243 has no support means at its front side, it will fall onto the first conveyor unit 41 or connection unit 49 from a standing position when losing its balance. At this time, the first conveyor unit 41 and/or the feed unit 45 keeps delivering the web products 241, the head waste 243 and/or the tail waste 245, and the head waste 243, the web products 241 and/or the tail waste 245 will pass through the screening unit 47, as shown in FIG. 7B.

Figure 7C:
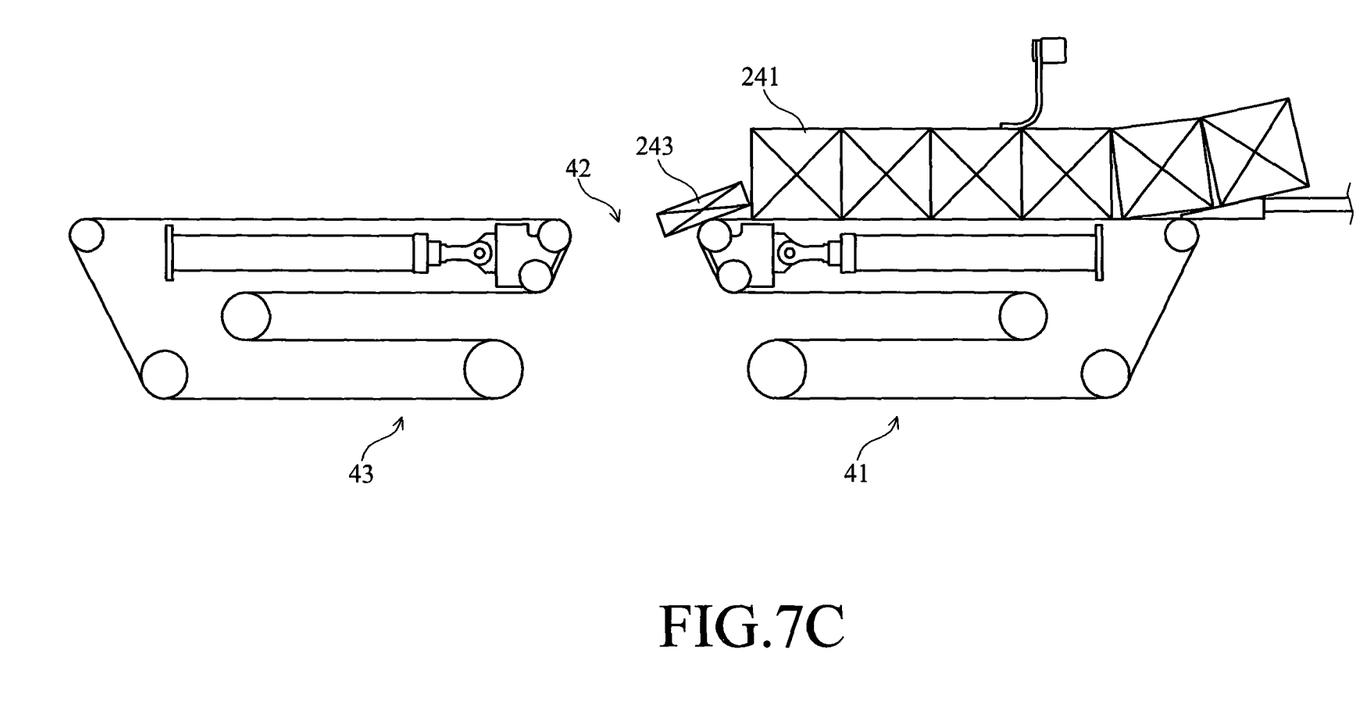
Figure 7D:
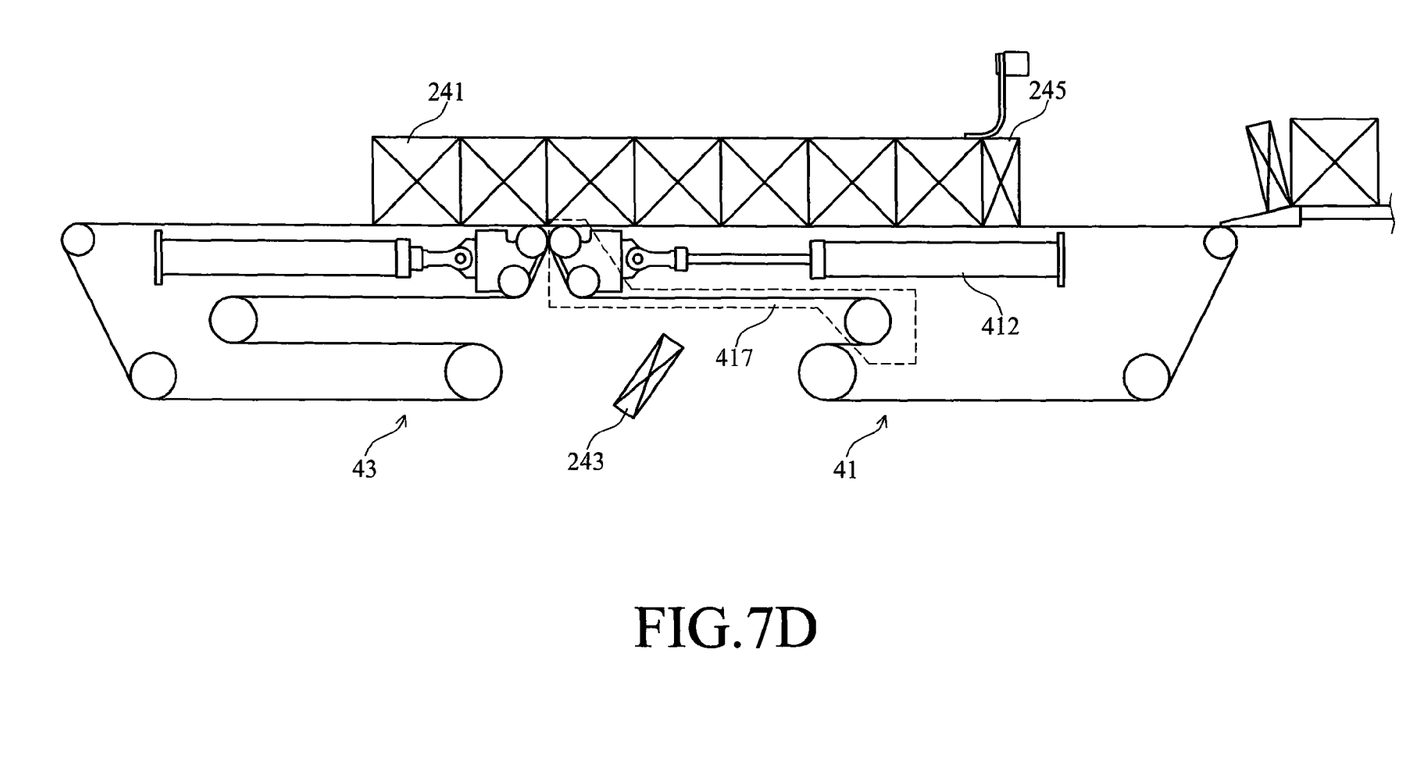

The first conveyor unit 41 keeps delivering the head waste 243, the web products 241 and/or tail wastes 245, enabling the head waste 243 to fall through the gap 42 between the first conveyor unit 41 and the second conveyor unit 43, as shown in FIG. 7C. When the head waste 243 falls out of the first conveyor unit 41 through the gap 42, the first movable wheel set 417 is moved toward the second conveyor unit 43, for example, the first air cylinder 412 that is connected to the first movable wheel set 417 is extended out, causing the first conveyor unit 41 and the second conveyor unit 43 to be connected together, for enabling following web products 241 to be delivered from the first conveyor unit 41 to the second conveyor unit 43. Alternatively, the second conveyor unit 43 can be controlled to extend toward the first conveyor unit 41, as shown in FIG. 7D.

In actual practice, the transmission speed of the first conveyor unit 41 and the length of the cylindrical fiber material 24 or combined length of web products 241 are calculated, and the calculated data is used for controlling displacement of the first conveyor unit 41 and/or the second conveyor unit 43, determining the size of the gap 42 between the first conveyor unit 41 and the second conveyor unit 43. For example, when all web products 241 have been delivered by the first conveyor unit 41 to the second conveyor unit 43, the first conveyor unit 41 and the second conveyor unit 43 are moved relative to each other, enabling the web products 241, the head waste 243 and/or the tail waste 245 to be sorted.

Figure 7E:
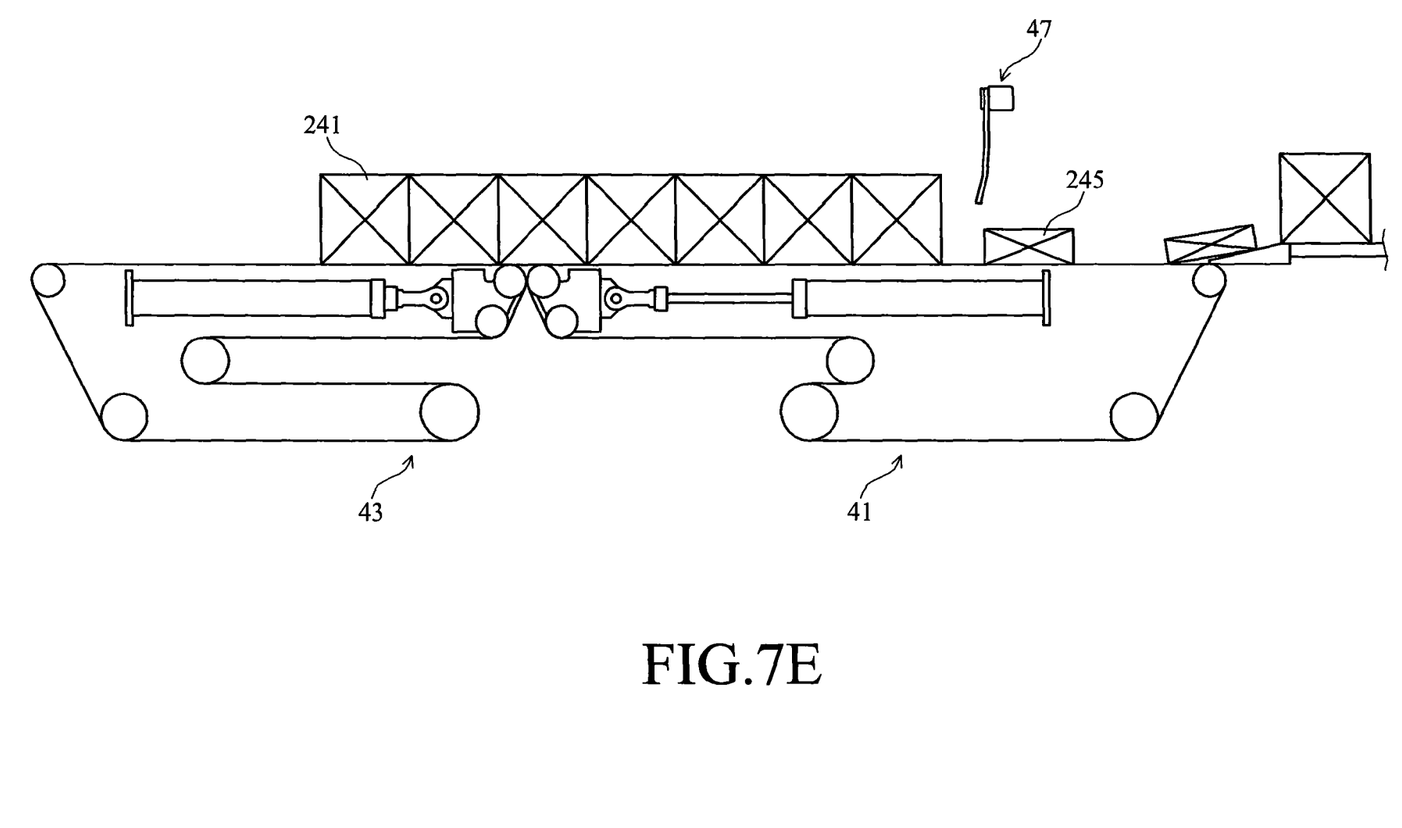

When the first conveyor unit 41 and the second conveyor unit 43 are connected together, the first conveyor unit 41 can deliver the web products 241 to the second conveyor unit 43. When the first conveyor unit 41 is delivering the web products 241 and the tail waste 245, the web products 241 and the tail waste 245 will touch the screening unit 47, and therefore the tail waste 245 will be caused to fall onto the first conveyor unit 41 from a standing position, as shown in FIG. 7E.

Figure 7F:
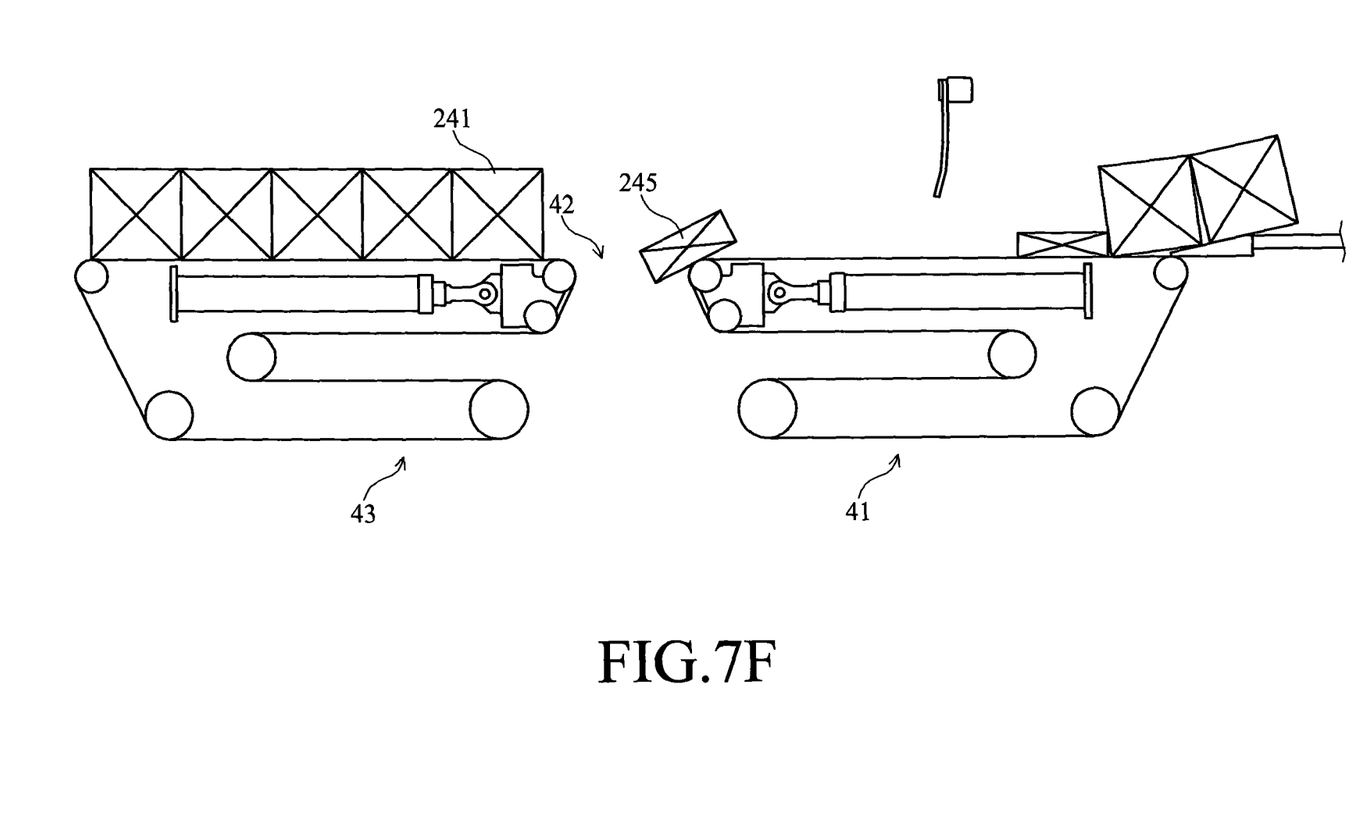

After the first conveyor unit 41 delivered web products 241 to the second conveyor unit 43, the first conveyor unit 41 is separated from the second conveyor unit 43. After separation of the first conveyor unit 41 from the second conveyor unit 43, the following tail waste 245 is not delivered to the second conveyor unit 43 and will fall out of the first conveyor unit 41 through the gap 42 between the first conveyor unit 41 and the second conveyor unit 43, as shown in FIG. 7F. In an alternate form of the present invention, the second conveyor unit 43 can be moved away from the first conveyor unit 41, enabling the following tail waste 245 to fall out of the first conveyor unit 41 through the gap 42.

When the first conveyor unit 41 is delivering a head waste 243 and or a tail waste 245, the head waste 243 and or tail waste 245 is kept rested on the first conveyor unit 41 in horizontal. When compared to a standing position, resting a head waste 243 and or tail waste 245 on the first conveyor unit 41 in horizontal enables the head waste 243 and or tail waste 245 to fall out of the first conveyor unit 41 through the gap 42 earlier so that a relatively longer time is available for allowing adjustment of the position of the first conveyor unit 41 and the second conveyor unit 43, avoiding falling of a web product 241 through the gap 42 accidentally due to insufficient response time.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A web product sorting machine, comprising:
 a promiscuous conveyor unit adapted for delivering at least one web product including at least one tail waste and at least one head waste to be sorted;
 a selective conveyor unit disposed adjacent to said promiscuous conveyor unit and adapted for receiving said web product from said promiscuous conveyor unit, wherein a gap is defined between said promiscuous conveyor unit and said selective conveyor unit for enabling said at least one tail waste and head waste to fall therein;
 a screening unit disposed above said promiscuous conveyor unit for imparting a frictional resistive force in a direction opposite to a forward conveying progress of said web product, said screening unit including a damper portion extending therefrom to engage a portion of said tail waste and tip the engaged portion of said tail waste away from the progressing web product and thereby cause said tail waste to fall onto said promiscuous conveyor unit from a standing position; and,
 a feed unit defining a surface disposed above said promiscuous conveyor and operatively coupled thereto via a connection unit disposed therebetween, said connection unit defining a surface sloping downward from said feed unit to said promiscuous conveyor unit, said connection unit enabling said head waste to fall onto said promiscuous conveyor unit for sorting.

2. The web product sorting machine as claimed in claim 1, wherein the feed unit is connected to said promiscuous conveyor unit and disposed at an elevation higher than said promiscuous conveyor unit for feeding said web product, said tail waste, and said head waste to said promiscuous conveyor unit and for enabling said head waste to fall to said promiscuous conveyor unit during feeding.

3. The web product sorting machine as claimed in claim 1, wherein said promiscuous conveyor unit comprises a first drive wheel, a first tension wheel, a first fixed wheel, a first movable wheel set and a first conveyor belt wound round said first movable wheel set, said first drive wheel, said first fixed wheel and said first tension wheel.

4. The web product sorting machine as claimed in claim 3, wherein said selective conveyor unit comprises a second drive wheel, a second tension wheel, a second fixed wheel, a second movable wheel set and a second conveyor belt wound round said second movable wheel set, said second drive wheel, said second fixed wheel and said second tension wheel.

5. The web product sorting machine as claimed in claim 4, wherein said first movable wheel set and/or said second movable wheel set is movable to adjust the size of said gap.

6. The web product sorting machine as claimed in claim 1, wherein said screening unit is a damper prepared from an elastically deformable material and spaced above said first conveyor unit at a distance shorter than the height of said web product and said tail waste.

7. The web product sorting machine as claimed in claim 1, further comprising a top conveyor unit disposed above said promiscuous conveyor unit, said selective conveyor unit and said gap.

8. A web product sorting machine, comprising:
 a promiscuous conveyor unit adapted for delivering at least one web product including at least one head waste and at least one tail waste;
 a selective conveyor unit disposed adjacent to said promiscuous conveyor unit and adapted for receiving said web product from said promiscuous conveyor unit, wherein a gap is defined between said promiscuous conveyor unit and said selective conveyor unit for enabling said head waste and tail waste to fall therein;
 a screening unit disposed above said promiscuous conveyor unit, said screening unit including a damper portion extending therefrom to engage a portion of said tail waste and tip the engaged portion of said tail waste away from the progressing web product and thereby cause said tail waste to fall onto said promiscuous conveyor unit from a standing position;
 a connection unit; and
 a feed unit defining a surface connected to said promiscuous conveyor unit via said connection unit, wherein said feed unit is disposed at an elevation higher than said promiscuous conveyor unit for feeding said web product including said head waste and said tail waste to said promiscuous conveyor unit, the connection unit defining a surface sloping downward in a direction of conveyance of said web product from said feed unit to said promiscuous conveyor unit for sorting and said connection unit enabling said head waste to fall onto said promiscuous conveyor unit from a standing position to a position orthogonal thereto.

9. The web product sorting machine as claimed in claim 8, wherein said promiscuous conveyor unit comprises a first drive wheel, a first tension wheel, a first fixed wheel, a first movable wheel set and a first conveyor belt wound round said first movable wheel set, said first drive wheel, said first fixed wheel and said first tension wheel.

10. The web product sorting machine as claimed in claim 9, wherein said selective conveyor unit comprises a second drive wheel, a second tension wheel, a second fixed wheel, a second movable wheel set and a second conveyor belt wound round said second movable wheel set, said second drive wheel, said second fixed wheel and said second tension wheel.

11. The web product sorting machine as claimed in claim 10, wherein said first movable wheel set and/or said second movable wheel set is movable to adjust the size of said gap.

12. The web product sorting machine as claimed in claim 8, further comprising a top conveyor unit disposed above said promiscuous conveyor unit, said selective conveyor unit and said gap.

\* \* \* \* \*